United States Patent
Hainz et al.

(10) Patent No.: US 8,886,471 B2
(45) Date of Patent: Nov. 11, 2014

(54) ROTATION SENSING METHOD AND SYSTEM

(75) Inventors: Simon Hainz, Villach (AT); Dirk Hammerschmidt, Villach (AT); Ernst Katzmaier, Villach (AT)

(73) Assignee: Infineon Technologies AG, Neubiberg (DE)

( * ) Notice: Subject to any disclaimer, the term of this patent is extended or adjusted under 35 U.S.C. 154(b) by 896 days.

(21) Appl. No.: 12/146,797

(22) Filed: Jun. 26, 2008

(65) Prior Publication Data

US 2009/0326860 A1    Dec. 31, 2009

(51) Int. Cl.
- *G01F 1/00* (2006.01)
- *G01P 3/487* (2006.01)
- *G01P 3/481* (2006.01)
- *G01P 3/489* (2006.01)
- *G01D 5/244* (2006.01)

(52) U.S. Cl.
CPC ............... *G01P 3/487* (2013.01); *G01P 3/481* (2013.01); *G01P 3/489* (2013.01); *G01D 5/24452* (2013.01); *G01D 5/2448* (2013.01); *G01D 5/24485* (2013.01); *G01D 5/24461* (2013.01)
USPC .......................................................... 702/45

(58) Field of Classification Search
None
See application file for complete search history.

(56) References Cited

U.S. PATENT DOCUMENTS

| | | | |
|---|---|---|---|
| 3,962,726 A | 6/1976 | De Land, Jr. | |
| 4,931,949 A * | 6/1990 | Hernandez et al. | 702/35 |
| 5,277,482 A | 1/1994 | Beyer et al. | |
| 5,296,855 A | 3/1994 | Matsuzaki et al. | |
| 5,377,535 A | 1/1995 | Angermaier | |
| 5,930,905 A * | 8/1999 | Zabler et al. | 33/1 PT |
| 6,175,798 B1 | 1/2001 | Carpenter | |
| 6,204,658 B1 | 3/2001 | Stanusch et al. | |
| 6,276,188 B1 | 8/2001 | Horiuchi | |
| 6,625,527 B1 | 9/2003 | Ding et al. | |
| 7,085,638 B2 * | 8/2006 | Knoll | 701/41 |
| 7,184,876 B2 | 2/2007 | Teulings et al. | |
| 7,342,399 B1 | 3/2008 | Wiegert | |
| 7,358,723 B2 | 4/2008 | Hinz et al. | |
| 2006/0025959 A1* | 2/2006 | Gomez et al. | 702/150 |
| 2006/0071659 A1* | 4/2006 | Tatschl et al. | 324/207.25 |
| 2007/0146730 A1* | 6/2007 | Wright | 356/617 |

FOREIGN PATENT DOCUMENTS

| | | |
|---|---|---|
| DE | 69111300 T2 | 4/1996 |
| DE | 19602359 A1 | 7/1997 |
| DE | 19749791 A1 | 5/1999 |
| EP | 0458121 A1 | 11/1991 |
| JP | 63172966 A | 7/1988 |
| JP | 3167478 A | 7/1991 |
| WO | 00/08475 A1 | 2/2000 |

* cited by examiner

*Primary Examiner* — Aditya Bhat

(74) *Attorney, Agent, or Firm* — Dicke, Billig & Czaja, PLLC (57) ABSTRACT

A sensing system and method. A coded wheel is configured to generate a signal that varies with rotation of the coded wheel. A sensor is configured to sense the varying signal and output a corresponding signal. A correction module is configured to receive the signal output by the sensor and compare the received signal to a stored signal and detect a defect in the coded wheel in response to the comparison.

26 Claims, 6 Drawing Sheets

ROTATION SENSING METHOD AND SYSTEM

BACKGROUND

Sensors for angular measurement of a rotating member, such as an automobile tire, camshaft, crankshaft, steering wheel, etc. are common. Magnetic field sensors are often preferred over other sensor types due to their robustness and low production costs. A magnetic sensor typically includes a rotatable element and a magnetic field sensor that is stationary relative to the rotatable element. The rotatable element defines teeth or is magnetically coded around its edge, and as the toothed or magnetically patterned regions pass the sensor a magnetic field is induced. The normal component of the induced field at the position of the sensor has a sinusoidal-like shape.

The magnetic field sensor element (for example, Hall-effect sensor, Giant Magneto Resistance (GMR) sensor, etc.) converts the applied magnetic field into a proportional electrical signal. Signal processing, such as zero-crossing detection, is used to convert the sinusoidal-like signal into a binary sequence that is a digital representation of the pattern on the wheel. Knowing the pattern, the rotational speed and angular position can be determined from this binary signal.

Various factors such as packaging and mounting tolerance, mechanical vibrations, temperature variations, defects in the teeth or magnetic pattern, etc. can cause variations of the electrical signal shape, such as displacement of the peak and zero value positions in the signal. In turn, these factors can cause measurement errors.

For example, automotive antilock brake systems (ABS) measure the speed of rotating tires using magnetic sensors. If the ABS sensor detects a change of the speed of a tire, it takes corrective action. If the magnetic sensor system provides an incorrect speed indication, the ABS could activate unnecessarily—even if the wheel speed is correct.

For these and other reasons, there is a need for the present invention.

SUMMARY

Embodiments of a sensing system and method are disclosed. A coded wheel is configured to generate a signal that varies with rotation of the coded wheel. A sensor is configured to sense the varying signal and output a corresponding signal. A correction module is configured to receive the signal output by the sensor and compare the received signal to a stored signal and detect a defect of the coded wheel in response to the comparison.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1A:
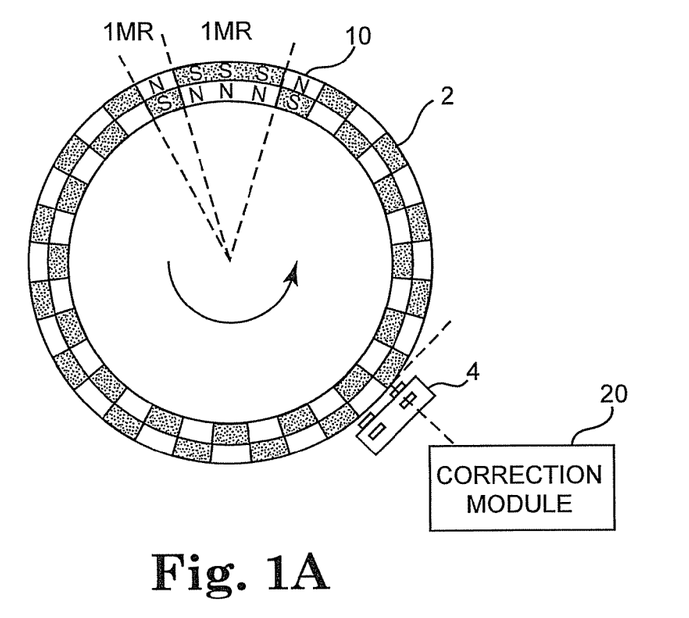
FIG. 1A is a schematic diagram illustrating an embodiment of a sensing system.

FIG. 1A is a schematic diagram illustrating an embodiment of a sensor system 1 including a coded wheel 2 and a sensor 4. In some embodiments, the coded wheel 2 includes a magnetic pattern 10 situated about the periphery of the wheel 2. In such embodiments, the sensor 4 is a magnetic sensor, so that when the wheel 2 rotates relative to the sensor 4, a magnetic field is induced that varies with rotation of the wheel 2. The normal component of the induced field at the position of the sensor 4 has a sinusoidal-like shape. The sensor 4 converts the sensed magnetic field into an electrical signal that is received by a correction module 20. The correction module 20 typically includes a suitable processing device, such as a microprocessor, digital signal processor (DSP), application-specific integrated circuit (ASIC), etc. Moreover, in some embodiments, the correction module 20 is integral to the sensor 4 (implemented on a single chip), and in other embodiments it is separate from the sensor 4.

Figure 1B:
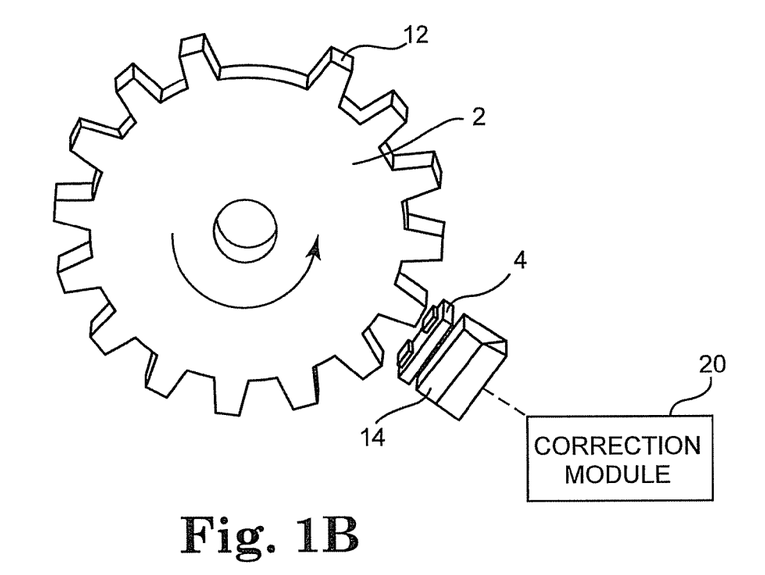
FIG. 1B is a schematic diagram illustrating another embodiment of a sensing system.

FIG. 1B illustrates another embodiment of the sensing system 1, where the coded wheel 2 defines teeth 12 about the periphery of the wheel 2 and a permanent magnet 14 is situated behind the sensor 4. As the toothed wheel 2 rotates relative to the sensor, the teeth cause variations in the magnetic field, which is sensed by the sensor 4 and converted to an electrical signal received by the processor 20.

The pattern of the magnetic pattern 10 or teeth 12 can be different from application to application. For example, for speed measurements such as would be used for ABS applications, a periodic north south coding is used. For camshaft applications, a non-periodic coding is used. In other embodiments, other types of sensors are used, such as capacitive, inductive, optical, inductive, etc. The type of coding on the wheel 2 varies accordingly. For instance, in the case of a capacitive sensor, the pattern 10 could be a conductive pattern that causes capacitance to vary as the wheel 2 rotates relative to the sensor 4, or in the case of an optical sensor, the pattern 10 could include varying light and dark areas.

Figure 2:
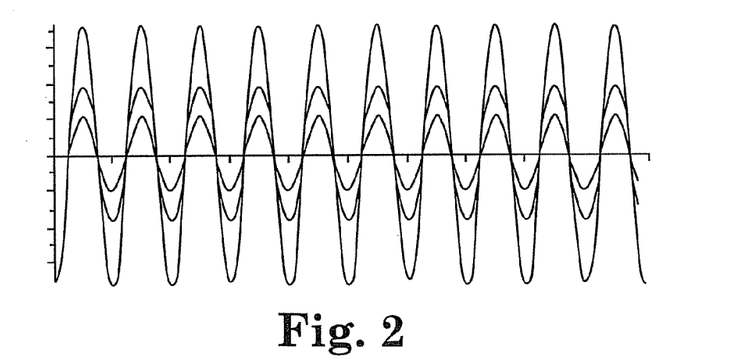
FIG. 2 illustrates the normal component of a magnetic field with a periodically coded magnet wheel.
Figure 3:
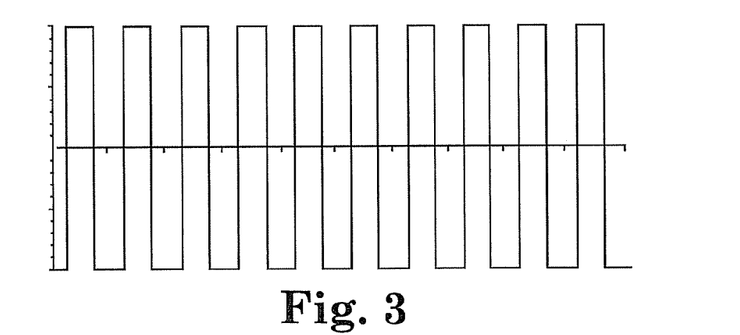
FIG. 3 illustrates a digitized version of the signal illustrated in FIG. 2.

FIG. 2 illustrates the normal component of the magnetic field at the sensor 4 with a periodically coded magnet wheel 2. As illustrated in FIG. 2, the magnetic field has a generally sinusoidal pattern resulting from rotation of the wheel 2. The signal output by the sensor 4 is proportional to the magnetic field. Typically, the signal is digitized by the sensor 4 or the processor 20 by sensing the zero-crossing of the signal. FIG. 3 illustrates an example of a digitized signal generated from a wheel 2 having north-south magnetic coding, wherein the sensor 4 and/or processor 20 measure and analyze the frequency or pulse-width of the resulting square wave signal, for example. The speed of the wheel can be measured by measuring the pulse width of the digital signal. Variations of the revolution speed cause variations of the pulse width.

Factors such as contamination, aging, manufacturing variation, etc. can cause variation in the magnetization of the poles of the coded wheel 2. Some individual poles can be more strongly magnetized than others. Further, these factors can result in partly or completely short circuiting individual magnetic poles.

Figure 4:
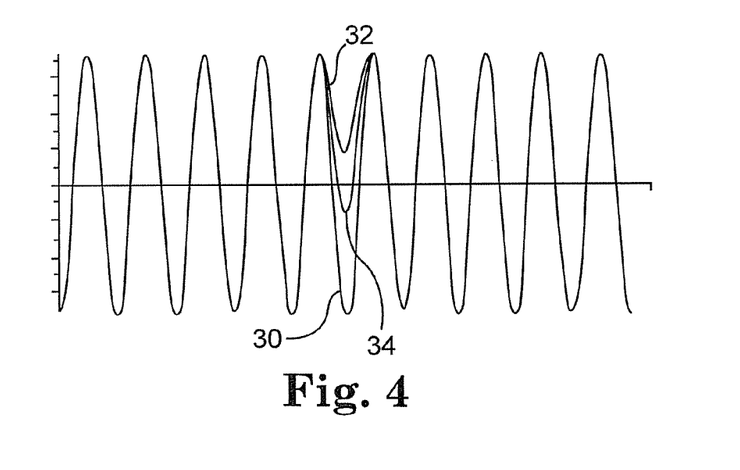
FIG. 4 illustrates the normal component of a magnetic field generated by a coded wheel having defects.

FIG. 4 illustrates various signals generated by the normal component of a magnetic field at the sensor 4. The signal resulting from an ideal magnet wheel is illustrated by curve 30. Curves 32 and 34 illustrate a signal resulting from a wheel having a partly demagnetized pole and a pole that is short circuited by iron splinters, respectively. The amplitude of curves 32 and 34 at the position of the defective poles is reduced, and curve 32 does not exhibit a zero-crossing.

Figure 5:
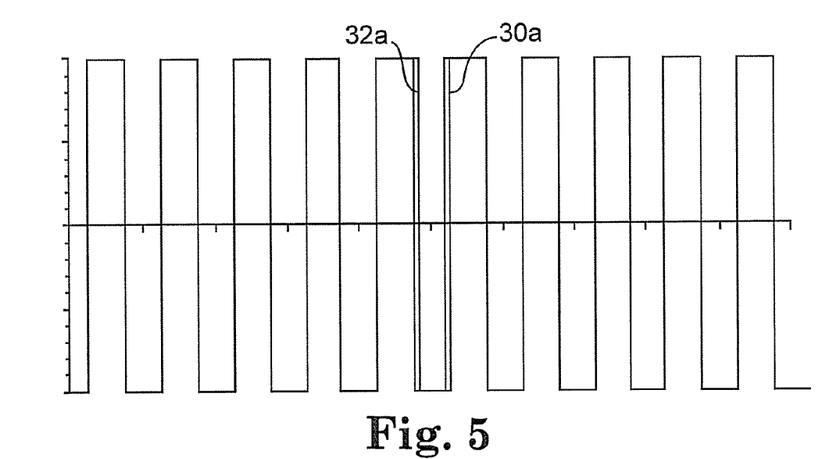
FIG. 5 illustrates digitized versions of two of the signals illustrated in FIG. 4.

FIG. 5 illustrates digitized versions of the signals 30a and 32a resulting from a zero-crossing detection process. The wheel 2 is turning at a constant speed, which is reflected by the constant pulse-width of curve 30a (no defects). With curve 32a, however, the varying amplitude of the sinusoidal signal 32 shown in FIG. 4 results in a corresponding change in the zero-crossing at the location of the defective pole, thus changing the pulse-width/frequency of the digitized signal 32a.

Figure 6:
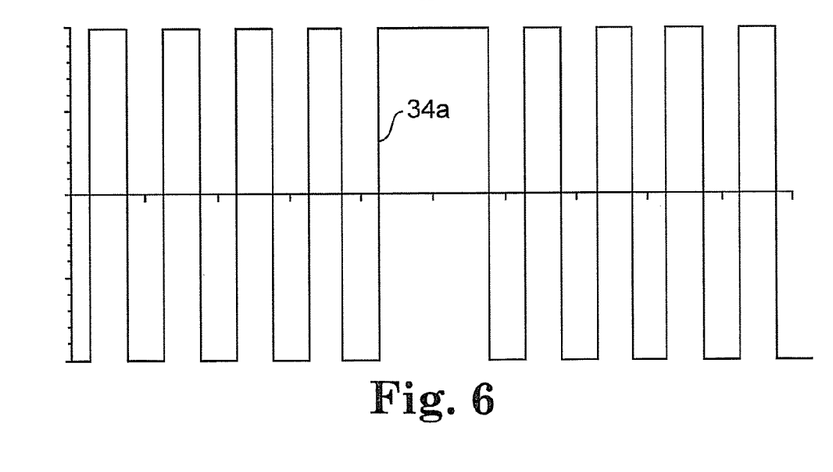
FIG. 6 illustrates a digitized version of one of the signals illustrated in FIG. 4

FIG. 6 illustrates a digitized version 34a of curve 34. As shown in FIG. 4, the curve 34 does not have a zero-crossing in the area of the defective pole due to a defect in the coded wheel 2. This is results in a "skipped" pulse in the corresponding digitized version 34a illustrated in FIG. 6, changing the pulse-width/frequency of the signal. Therefore, even though the wheel 2 is turning at a constant speed, the frequency changes demonstrated by signals 32a and 34a would be interpreted by the processor 20 as a speed change. When the sensing system 1 is used in an ABS application, for example, this could result in unnecessarily activating the ABS system. In this situation, the activated ABS system would vary the (constant) wheel speed.

Typical defects (manufacturing, aging, etc.) in the pattern 10 or teeth 12 of the wheel 2 are constant for long periods of time, or at least for several revolutions. If the wheel 2 is rotating at a constant speed, the resulting field and corresponding signal output by the sensor 4 is consistent and repeats itself after each full revolution of the wheel 2. Assuming a constant rotation speed, the signal output by the sensor 4 representing a revolution of the wheel 2, or a portion of a revolution, will match a stored signal representing a previous rotation or corresponding portion of a rotation. Thus, if a comparison of a received signal and a stored signal from an earlier rotation display the same anomalies (such as a pulse-width/frequency change), it can be assumed that the anomaly is due to a defect in the coded wheel, rather than a change in rotation speed.

Figure 7:
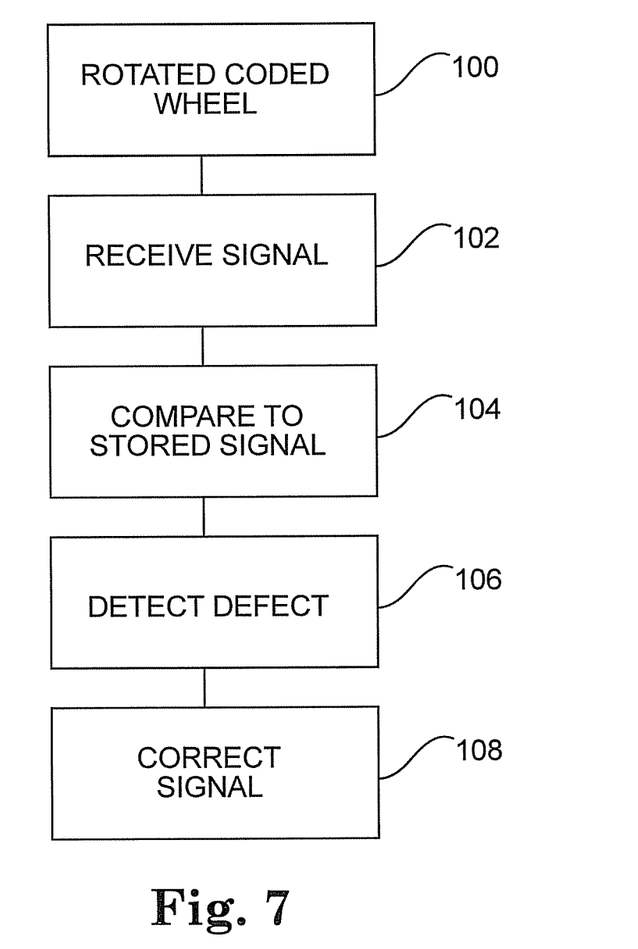
FIG. 7 is a flow diagram illustrating an embodiment of a rotation sensing method.

FIG. 7 is a flow diagram generally illustrating an embodiment of a disclosed rotation sensing method. In Block 100 the coded wheel 2 is rotated, which as discussed above results in a signal representing rotation of the wheel 2 that is output by the sensor 4 and received by the correction module 20 (block 102). In block 104, the received signal is compared to one or more stored signals. The conversion module 20 has access to a memory that stores a signal representing an earlier rotation or portion of a rotation of the coded wheel 2. For example, signals representing one or more of the rotations immediately preceding the current rotation can be stored. The magnetic pattern on the wheel 2 can be known by the correction module 20 and pre-stored in memory, or "learned" during startup, for example.

If the received signal includes an anomaly, such as a change in frequency, and the stored signal has the same anomaly, it can be assumed that the anomaly is due to a defect in the coded wheel 2, rather than a change in rotation of the wheel 2. Thus, in block 106, a defect in the coded wheel can be detected in response to the comparison of the received signal with the stored signal. In block 108, the received signal is corrected by the correction module 20.

Figure 8:
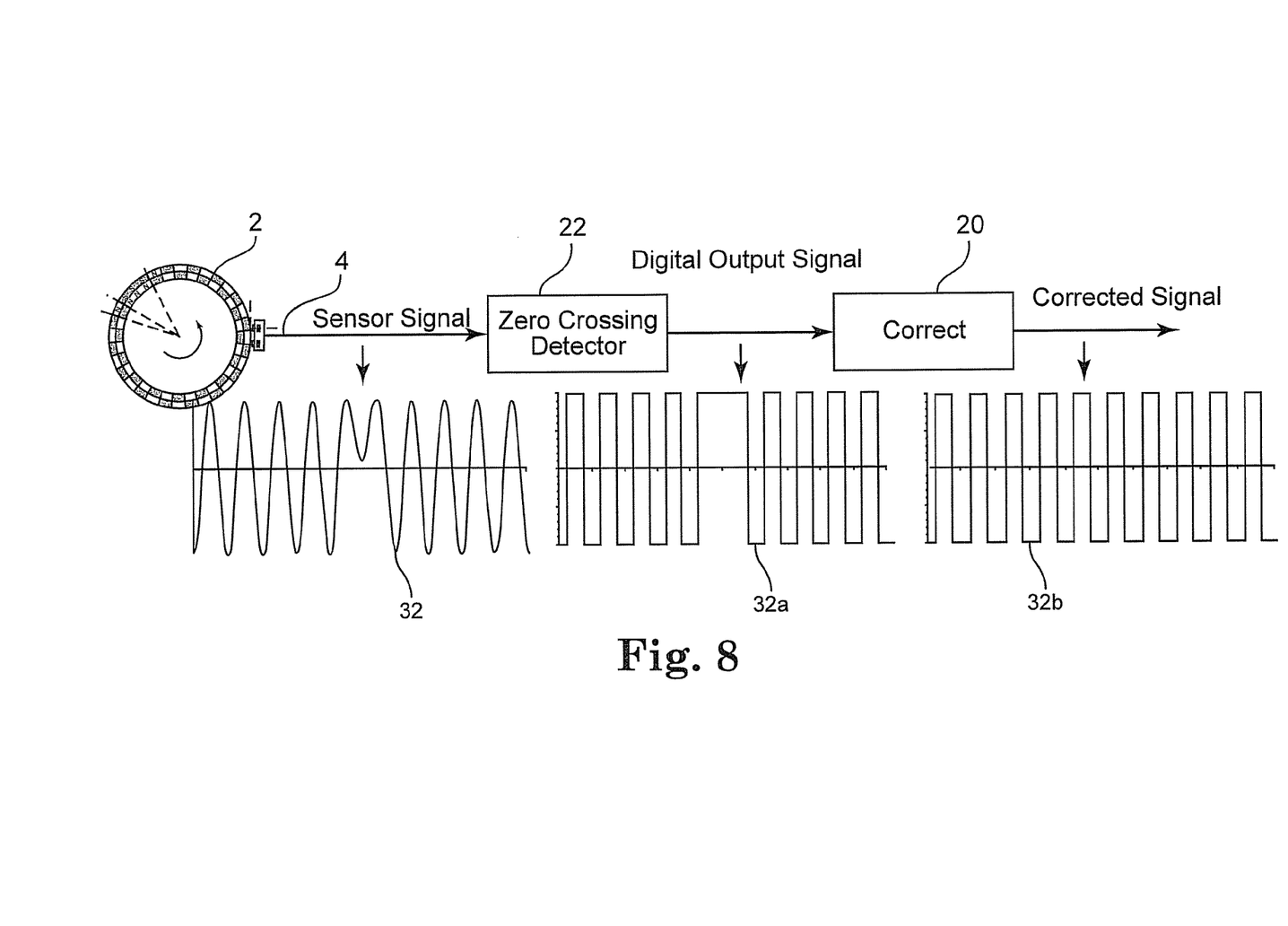
FIG. 8 illustrates an embodiment of a signal correction process.

In some embodiments, the sensor 4 outputs an analog signal that is converted to a binary signal by a suitable analog-to-digital conversion process, such as zero-crossing detection in the continuous time or discrete time domain. The binary signal is then stored and compared, and upon detection of a defect, the binary signal is corrected. FIG. 8 conceptually illustrates such a process, where the sensor signal is digitized and corrected. The coded wheel 2 rotates, generating a varying magnetic field 32 that is output by the sensor. The analog signal 32 is digitized, for example by a zero-crossing detector 22, which outputs the digital signal 32a. The amplitude of the analog signal 32 varies due to a defect in the coded wheel 2, resulting in a frequency variation in the digital signal 32a. The received digital signal 32a is received by the correction module 20, and the received signal 32a is compared to one or more stored signals as illustrated in block 104 of FIG. 7. If the comparison determines that the stored signal has the same frequency pattern as the received signal 32a, it is assumed this is due to a defect in the coded wheel 2. Thus, the correction module corrects the signal 32a (effectively adding the "missing" pulse), and outputs a corrected signal 32b.

Figure 9:
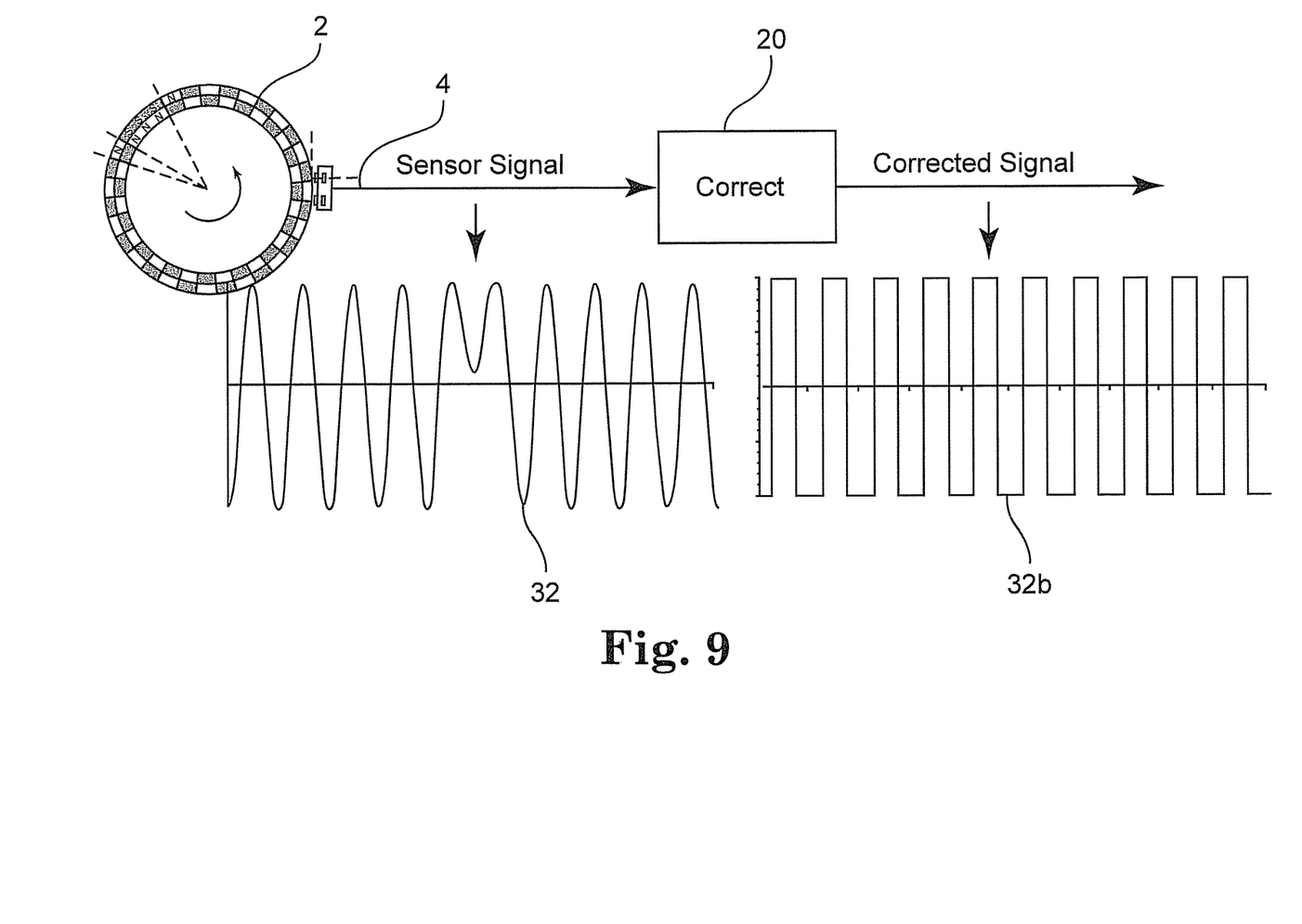
FIG. 9 illustrates another embodiment of a signal correction process.

In other embodiments, the analog signal 32 is stored and analyzed, resulting in detection of defects and signal correction. FIG. 9 conceptually illustrates such an embodiment, where the analog sensor signal 32 is received by the correction module, which performs the signal comparison/analysis and directly outputs the corrected digital signal 32b. Variations caused by aging of the magnetic wheel, for example, may be better detected in the analog domain. Thus, in addition to analyzing and comparing the pulse-width or frequency, parameters such as the amplitude of the waveform, gradient, peak value, etc. can be used to detect defects. The analog values can be stored in the analog domain using capacitors or similar solutions.

The analog signal can also be converted into the digital domain, and digital signal processing can be used to evaluate the signal. FIG. 8 conceptually illustrates such an embodiment where a single bit analog-to digital converter (ADC) (i.e. zero crossing detection) is used to convert the analog signal into a binary signal. Using a multi-bit ADC the signal 32a has a higher number of different quantization levels and therefore the same parameters as described above can be used to detect defects.

Embodiments are envisioned where a physical or mathematical model of the sensor signal is generated and used for analysis. Using a model, additional information about the arrangement can be determined. For example, a physical model can describe the magnetic field as a function of the magnetic strength and pattern. The parameter values can be estimated adaptively. It is also possible to work in the frequency domain. The frequency components of the waveform can be measured and evaluated. Frequency measurements can be done in the analog or digital domain (for example, using a FFT).

Additional output signals can be provided by the correction module 20. For example, information such as whether the actual output signal was corrected, if some defect on the pole wheel was detected, can be output. In the simplest case the output signal is a binary signal which delivers the information as to whether there is a defect in the coded wheel 2 or not. Alternatively, the output signal can provide more precise information about the defects, for example, the particular angular position(s) of defects, changes in the magnetic strength of a pole, etc.

The correction module 20 can be configured to detect some errors, for example, defects on the pole wheel, but without correcting them. It is also possible to correct the output signal only a predetermined number of times, for example, two times per revolution. If more than a predetermined number of errors are detected, the correction algorithm may be disabled. Or, in some embodiments, the output signal is corrected only if more then a predetermined number of errors is detected.

In addition to use with coded wheels 2 having a periodic pattern (for example, alternating magnetic regions as described above), in some embodiments the correction module 20 is employed with coded pole wheels 2 having a non-periodic pattern. One example is a pole wheel with one magnet which is longer as the other ones. Also, a more complex magnetic pattern can be used. In one embodiment, variations of the air gap between sensor element and pole wheel cause a displacement of the zero-crossing position. However, typically such a zero-crossing displacement would be constant over a few revolutions, thus allowing use of the disclosed method.

As noted above, in embodiments such as illustrated in FIG. 1B, a toothed wheel 3 made of a magnetic material such as iron is used and a permanent magnet 14 is mounted at a fixed angular position to generate a constant magnetic field. When the wheel 3 rotates, it influences the constant field of the magnet 14. The magnetic field at the sensor 4 has a sinusoidal-like waveform, similar to the waveforms shown in FIG. 4, though with an additional DC component. Due to the DC component the magnetic signal has no zero-crossings. In this situation, the sensor 4 and/or correction module 20 is configured to remove or otherwise compensate for the DC component, for example, using a high pass filter, feed back system, etc. After removing the DC component, the system can operate as described above.

Information detected, such as pulse-width variation, can be measured on one or more revolutions of the coded wheel 2. Mathematical functions such as averaging can be used to calculate a reference pattern. By knowing the pattern of previous revolutions, some defects can be detected or even predicted. For instance, the binary pattern of one revolution could be stored daily (or at another appropriate interval). Comparing the patterns of several periods allows, for example, the demagnetization effect of the pole wheel to be detected and the time until a first error in the output signal to be predicted.

The pulse length can be measured using an integrator in the analog or digital domain. An integrator in the digital domain is typically realized by a counter and called a "Time to Digital Converter". It is also possible to measure the frequency (and not the pulse-width) of the binary signal. For example, a phase locked loop (PLL) can be used to generate a constant frequency, which is the center frequency of the binary signal. This constant frequency can be used as a corrected output signal or can be used to detect the frequency variations in the binary signal. The PLL can be implemented analog (called phase locked loop), mixed signal (called digital phase locked loop) or fully digital (called all-digital phase locked loop).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of sensing rotation of a rotatable member, comprising:
   rotating a rotatable member having a coded wheel attached thereto, such that the coded wheel rotates relative to a sensor;
   receiving a signal that varies with the rotation of the coded wheel;
   comparing the received signal to a stored signal;
   detecting a physical defect in the coded wheel in response to the comparison;
   correcting the received signal in response to detecting a physical defect; and
   sensing rotation of the rotatable member based on the corrected signal.

2. The method of claim 1, wherein the received signal represents a rotation of the coded wheel, and wherein the stored signal represents a previous rotation of the coded wheel.

3. The method of claim 2, further comprising:
   storing the received signal; and
   comparing a subsequent received signal to the stored received signal.

4. The method of claim 1, further comprising storing a plurality of received signals.

5. The method of claim 1, wherein comparing the received signal to the stored signal includes comparing at least one of zero-crossings, peaks, fixed signal levels, and signal gradients.

6. The method of claim 1, wherein comparing the received signal to the stored signal includes comparing frequencies of the received and stored signals.

7. The method of claim 1, further comprising converting the received signal to a digital signal.

8. The method of claim 7, wherein converting the received signal to a digital signal includes a zero-crossing detection process.

9. The method of claim 7, wherein converting the received signal to a digital signal includes using an analog to digital converter.

10. The method of claim 1, wherein comparing the received signal to the stored signal includes comparing analog signals.

11. The method of claim 1, wherein the coded wheel defines a plurality of teeth, and wherein the physical defect includes a defect in the teeth.

12. The method of claim 1, wherein the coded wheel includes a magnetic pattern, and wherein the physical defect includes a defect in the magnetic pattern.

13. A sensing system, comprising:
 a coded wheel configured to generate a signal that varies with rotation of the coded wheel;
 a sensor configured to sense the varying signal and output a corresponding signal;
 a correction module configured to receive the signal output by the sensor and compare the received signal to a stored signal, detect a physical defect in the coded wheel in response to the comparison, and correct the received signal in response to detecting a defect.

14. The system of claim 13, wherein the coded wheel includes a magnetic pattern that induces a magnetic field that varies as the coded wheel rotates.

15. The system of claim 14, wherein the physical defect includes a defect in the magnetic pattern.

16. The system of claim 13, further comprising:
 a magnet establishing a magnetic field; and
 wherein the coded wheel defines a plurality of teeth configured to vary the established magnetic field as the coded wheel rotates.

17. The system of claim 16, wherein the physical defect includes a defect in the teeth.

18. The system of claim 13, wherein the sensor is a magnetic sensor.

19. The system of claim 13, wherein the sensor is a capacitive sensor.

20. The system of claim 13, wherein the sensor is an inductive sensor.

21. The system of claim 13, wherein the sensor is an optical sensor.

22. The system of claim 13, further comprising a memory configured to contain the stored signal.

23. The system of claim 22, wherein the memory contains a plurality of received signals.

24. The system of claim 22, wherein the correction module is configured to compare frequencies of the received and stored signals.

25. The system of claim 22, further comprising an analog-to-digital converter configured to convert the received signal to a digital signal.

26. The system of claim 25, wherein the wherein the analog-to-digital converter includes a zero-crossing detector.

\* \* \* \* \*